United States Patent
Giombanco et al.

(10) Patent No.: US 11,621,630 B2
(45) Date of Patent: Apr. 4, 2023

(54) SOFT-START FOR SWITCHING CONVERTER CONTROLLER WITH HYBRID HYSTERETIC CONTROL (HHC)

(71) Applicant: Texas Instruments Incorporated, Dallas, TX (US)

(72) Inventors: Salvatore Giombanco, Cassaro (IT); Brent Alan McDonald, Murphy, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 15 days.

(21) Appl. No.: 17/389,018

(22) Filed: Jul. 29, 2021

(65) Prior Publication Data
US 2022/0045603 A1 Feb. 10, 2022

Related U.S. Application Data
(60) Provisional application No. 63/061,047, filed on Aug. 4, 2020.

(51) Int. Cl.
*H02M 1/36* (2007.01)
*H02M 3/335* (2006.01)
*H02M 1/32* (2007.01)

(52) U.S. Cl.
CPC .............. *H02M 1/36* (2013.01); *H02M 1/32* (2013.01); *H02M 3/33569* (2013.01)

(58) Field of Classification Search
CPC ............ H02M 1/36; H02M 1/32; H02M 1/08; H02M 3/33569; H02M 3/33571; H02M 3/01; Y02B 70/10
See application file for complete search history.

(56) References Cited

U.S. PATENT DOCUMENTS

| | | |
|---|---|---|
| 9,991,801 B2 | 6/2018 | Wang et al. |
| 10,218,256 B2 | 2/2019 | Oh |
| 2011/0164437 A1* | 7/2011 | Sun .......................... H02M 3/01 363/16 |

(Continued)

FOREIGN PATENT DOCUMENTS

WO 2007120604 A2 10/2007

OTHER PUBLICATIONS

Texas Instruments, "UCC256301 Hybrid Hysteretic Mode Wide VIN LLC Resonant Controller Enabling Ultra-Low Standby Power," SLUSCU6C—Aug. 2017—Revised Jan. 2020.

(Continued)

*Primary Examiner* — Kyle J Moody
*Assistant Examiner* — Jye-June Lee
(74) *Attorney, Agent, or Firm* — Ray A. King; Frank D. Cimino

(57) ABSTRACT

A switching converter controller includes: a control loop adapted to be coupled to an output terminal of a power stage; and a hybrid hysteretic control (HHC) circuit coupled to the control loop. The HHC circuit includes a resonant capacitor voltage (Vcr) node adapted to be coupled to a resonant capacitor (Cr) of the power stage, where the Vcr node sums a sense voltage for Cr with a frequency compensation ramp. The HHC circuit also includes a soft-start controller coupled to the Vcr node. The soft-start controller includes a clamp circuit coupled to the Vcr node.

22 Claims, 8 Drawing Sheets

(56) References Cited

U.S. PATENT DOCUMENTS

| | | | | |
|---|---|---|---|---|
| 2011/0255321 A1* | 10/2011 | Figge | ............... | H02M 3/3382 |
| | | | | 363/132 |
| 2014/0313790 A1* | 10/2014 | Feng | ............... | H02M 1/36 |
| | | | | 363/21.02 |
| 2018/0048236 A1* | 2/2018 | Wang | ............... | H02M 3/33507 |
| 2019/0296650 A1* | 9/2019 | Wang | ............... | H02M 3/33573 |
| 2022/0247320 A1* | 8/2022 | Stracquadaini | ... | H02M 3/33569 |

OTHER PUBLICATIONS

International Search Report dated Oct. 7, 2021.

* cited by examiner

SOFT-START FOR SWITCHING CONVERTER CONTROLLER WITH HYBRID HYSTERETIC CONTROL (HHC)

CROSS-REFERENCE TO RELATED APPLICATIONS

This application claims priority to U.S. Provisional Application No. 63/061,047, filed Aug. 4, 2020, which is hereby incorporated by reference.

BACKGROUND

As new electronic devices are developed and integrated circuit (IC) technology advances, new IC products are commercialized. One example IC product for electronic devices is a switching converter controller for a power stage with one or more switches. One example power stage includes a high-side switch, a low-side switch, and an LLC (inductor-inductor-capacitor) resonant tank circuit with a resonant capacitor (Cr). An example switching converter controller includes a control loop and a hybrid hysteretic control (HHC) circuit coupled to the control loop.

FIG. 1A is a block diagram of a switching converter 100 having a control loop 102 and an HHC circuit 114 in accordance with a conventional approach. The switching converter 100 also includes power stage 116. As shown, the power stage 116 includes a high-side switch (S1) and a low-side switch (S2) coupled in series between an input voltage (VIN) and ground (GND). In the example of FIG. 1A, S1 is an n-type metal-oxide semiconductor field-effect transistor (MOSFET) controlled by a high-side control signal (HO), and S2 is a n-type MOSFET controlled by a low-side control signal (LO). For each of S1 and S2, parasitic capacitance is represented by respective capacitors across the respective current terminals of S1 and S2. Between S1 and S2 is a switch node 108 coupled to an LLC resonant tank circuit of the power stage 116, where the LLC resonant tank circuit includes an inductor (L1), a primary coil of transformer X1, and Cr. In some embodiments, L1 is a leakage inductance inside X1. As shown, the switch node 108 is coupled to a first side of L1, while the second side of L1 is coupled to a first side of the primary coil of X1. Also, the second side of the primary coil of X1 is coupled to a first side of Cr, and the second side of Cr is coupled to ground.

As shown, the first side of Cr is coupled to the HHC circuit 114, which includes capacitors C4 and C5 in series between the first side of Cr and ground. Between C4 and C5 is a resonant capacitor voltage (Vcr) node 110. The Vcr node 110 sums a scaled down version of the resonant capacitor voltage across Cr and a frequency compensation ramp that adds or removes charge. As an example, the frequency compensation ramp may be generated by two matched current sources (CS1 and CS2). The charging current source (CS1) is on when S1 is on, and the discharging current source (CS2) is on when S2 is on. In operation, CS1 and CS2 add a triangular waveform to the VCR node 110.

In FIG. 1A, CS1 and CS2 are part of the HHC circuit 114 coupled to the Vcr node 110. In the example of FIG. 1A, CS1 is coupled between a reference voltage (Vref) and the Vcr node 110, and is controlled by HO. When CS1 is on (HO high), charge is added to the Vcr node 110. Meanwhile, CS2 is coupled between the Vcr node 110 and ground, and is controlled by LO. When CS2 is on (LO high), charge is removed from the Vcr node 110. With the HHC circuit 114, the voltage at the Vcr node 110 is compared with: a lower threshold (Vtl) by a first comparator 104; and a higher threshold (Vth) by a second comparator 106. The output of the first comparator 104 is a control signal (VCR_lt_Vtl) that indicates when the voltage at the Vcr node 110 is less than Vtl. The output of the second comparator 106 is a control signal (VCR_gt_Vth) that indicates when the voltage at the Vcr node 110 is greater than Vth. In the example of FIG. 1A, VCR_gt_Vth and/or VCR_lt_Vtl are provided to the control loop 102, which is configured to control HO, LO, Vth, and Vtl based at least in part on VCR_gt_Vth, VCR_lt_Vtl, a voltage loop compensator output (Vcomp), and an output voltage (VOUT) at an output node 112 of the power stage 116. More specifically, when VCR_gt_Vth is asserted, HO goes low, which turns off S1. Also, when VCR_lt_Vtl is asserted, LO goes low, which turns off S2. In addition, the control loop 102 uses: VOUT to determine Vcomp; and uses Vcomp to adjust Vth and Vtl. In one example embodiment, Vcomp is the output of an error amplifier with VOUT and a reference voltage as inputs to the error amplifier.

In the example of FIG. 1A, VOUT at an output node 112 is obtained from a center tap of the secondary coil of X1. As shown, the output node 112 is coupled to an output capacitor (COUT). More specifically, a first side of COUT is coupled to the output node 112, and a second side of COUT is coupled to ground. Meanwhile, a resistor (Rload) coupled to the output node 112 represents a load powered by the switching converter 100. As shown, a first side of Rload is coupled to the output node 112 and a second side of Rload is coupled to ground. In the example of FIG. 1, the second sides of COUT and Rload are also coupled to the anodes of diodes D1 and D2. The cathode of D1 is coupled to a first side of the secondary coil of X1, and the cathode of D2 is coupled to a second side of the secondary coil of X1. During normal operations, the control loop 102 is configured to control S1 and S2 to maintain VOUT at a target voltage to support the operations of the load even if Rload varies over time. During start-up, the conventional approach is to ramp Vth and Vtl slowly to push the LLC resonant tank circuit to a higher switching frequency and to limit the resonant current (Ires) peak. This is effective for some switching frequencies, but not all.

FIG. 1B is a timing diagram 120 of control signals for the switching converter of FIG. 1A in accordance with a conventional approach. As shown, the timing diagram 120 includes waveforms for HO, LO, and Vcr. At time t1, Vcr crosses Vtl and LO goes low (turning off S2). In the example of FIG. 1B, Vtl is a function of a voltage offset and Vcomp (e.g., Vtl=2.5V−Vcomp). More generically, $$Vtl = \frac{Vref}{2} - Vcomp.$$

At time t2, HO goes high (turning on S1), where the interval between t1 and t2 may vary. At time t3, Vcr crosses Vth and HO goes low (turning off S1). In some example embodiments, Vth is a function of a voltage offset and Vcomp (e.g., Vth=2.5V+Vcomp). More generically, $$Vth = \frac{Vref}{2} + Vcomp.$$

At time t4, LO goes high (turning on S2), where the interval between t3 and t4 may vary.

For the example of FIGS. 1A and 1B, $$k \times (\Delta Vcr + \Delta Vcr') = \frac{1}{Cr} \int_{t1}^{t4} Ires\, dt,$$

where ΔVcr is the change in Vcr between LO off and HO off, ΔVcr' is the change in Vcr during dead time, k is the Vcr sensing voltage divider ratio, k×(ΔVcr+ΔVcr') is the actual voltage change on Cr from t1 to t4, Cr is the resonant capacitance value, and Ires is the resonant current value (e.g., the current through L1). As previously described, the Vth and Vtl thresholds may be ramped slowly during start-up to push the LLC resonant tank circuit to a higher switching frequency and to limit the resonant current peak. This provides acceptable results, on the resonant peak current, for LLC-based power stages having a resonant frequency s 350 kHz. However, this conventional technique is ineffective for LLC-based power stages having a higher resonant frequency>350 kHz.

FIG. 2 is a graph 200 of voltages and currents related to the switching converter of FIG. 1A in accordance with a conventional approach. In the graph 200, waveforms for resonant inductor current (ILR) (e.g., the current in L1), Vcr, Vth, Vtl, and VOUT are shown. In FIG. 2, large overcurrent stress is caused by ILR. Also, Vcr has large overshoots with respect to the Vth and Vtl thresholds, which are very low during start-up. Accordingly, the HHC circuit 114 is unable to push the switching frequency high enough to limit both ILR and Vcr voltage peaks. In such scenarios, a large resonant current at start-up can overstress power stage components, such as a transformer (e.g., X1 in FIG. 1A), switches (e.g., S1 and S2 in FIG. 1A), and the resonant capacitor (e.g., Cr in FIG. 1A).

SUMMARY

In one example embodiment, a switching converter controller comprises: a control loop adapted to be coupled to an output terminal of a power stage; and a hybrid hysteretic control (HHC) circuit coupled to the control loop. The HHC circuit includes a resonant capacitor voltage (Vcr) node adapted to be coupled to a resonant capacitor (Cr) of the power stage, wherein the Vcr node sums a sense voltage for Cr with a frequency compensation ramp. The HHC circuit also includes a soft-start controller coupled to the Vcr node. The soft-start controller includes a clamp circuit coupled to the Vcr node.

In another example embodiment, a system comprises a power stage having: an inductor-inductor-capacitor (LLC) resonant tank circuit with a Cr; and an output terminal coupled to the LLC resonant tank circuit. The system also comprises a switching converter controller coupled to the power stage. The switching converter controller includes: a control loop adapted to be coupled to the output terminal; and a HHC circuit coupled to the control loop. The HHC circuit includes a Vcr node adapted to be coupled to Cr, wherein the Vcr node sums a sense voltage for Cr with a frequency compensation ramp. The HHC circuit also includes a soft-start controller coupled to the Vcr node. The soft-start controller includes a clamp circuit configured to clamp a voltage at the Vcr node during at least part of a start-up of the power stage.

In yet another example embodiment, a method is performed by a switching converter controller for a power stage having an LLC resonant tank circuit with a Cr. The method comprises: providing a Vcr node that sums a sense voltage for Cr with a frequency compensation ramp; and clamping, by a clamp circuit, a voltage at the Vcr node during at least part of a start-up of the power stage.

BRIEF DESCRIPTION OF THE DRAWINGS

The same reference numbers (or other reference designators) are used in the drawings to designate the same or similar (structurally and/or functionally) features.

DETAILED DESCRIPTION

Some example embodiments include a switching converter with: a power stage; and a switching converter controller having a control loop with a hybrid hysteretic control (HHC) input subject to soft-start clamping. In some example embodiments, the power stage includes an inductor-inductor-capacitor (LLC) resonant tank circuit with a resonant capacitor (Cr). In such embodiments, the HHC input is based on adding charge to or removing charge from a resonant capacitor voltage (Vcr). In some example embodiments, Vcr is the sum of a scaled down version of the resonant capacitor voltage across Cr and a frequency compensation ramp that adds or removes charge.

The switching converter controller also includes a soft-start controller coupled to the control loop. To control soft-start clamping of Vcr, the switching converter controller includes a soft-start controller with a clamp circuit configured to clamp Vcr during at least part of start-up (power-up) of the power stage. With the described solution, a particular profile is applied to the Vcr during start-up to control the resonant current. In some example embodiments, upper and lower voltage thresholds and a clamp circuit are used to control Vcr profile during start-up, enabling the system to operate at a higher switching frequency. By restricting Vcr during at least part of the start-up of the power stage, a large resonant current and related stress on power stage components (e.g., transformer coils, switches, Cr, and/or other components) is avoided.

Figure 1A:
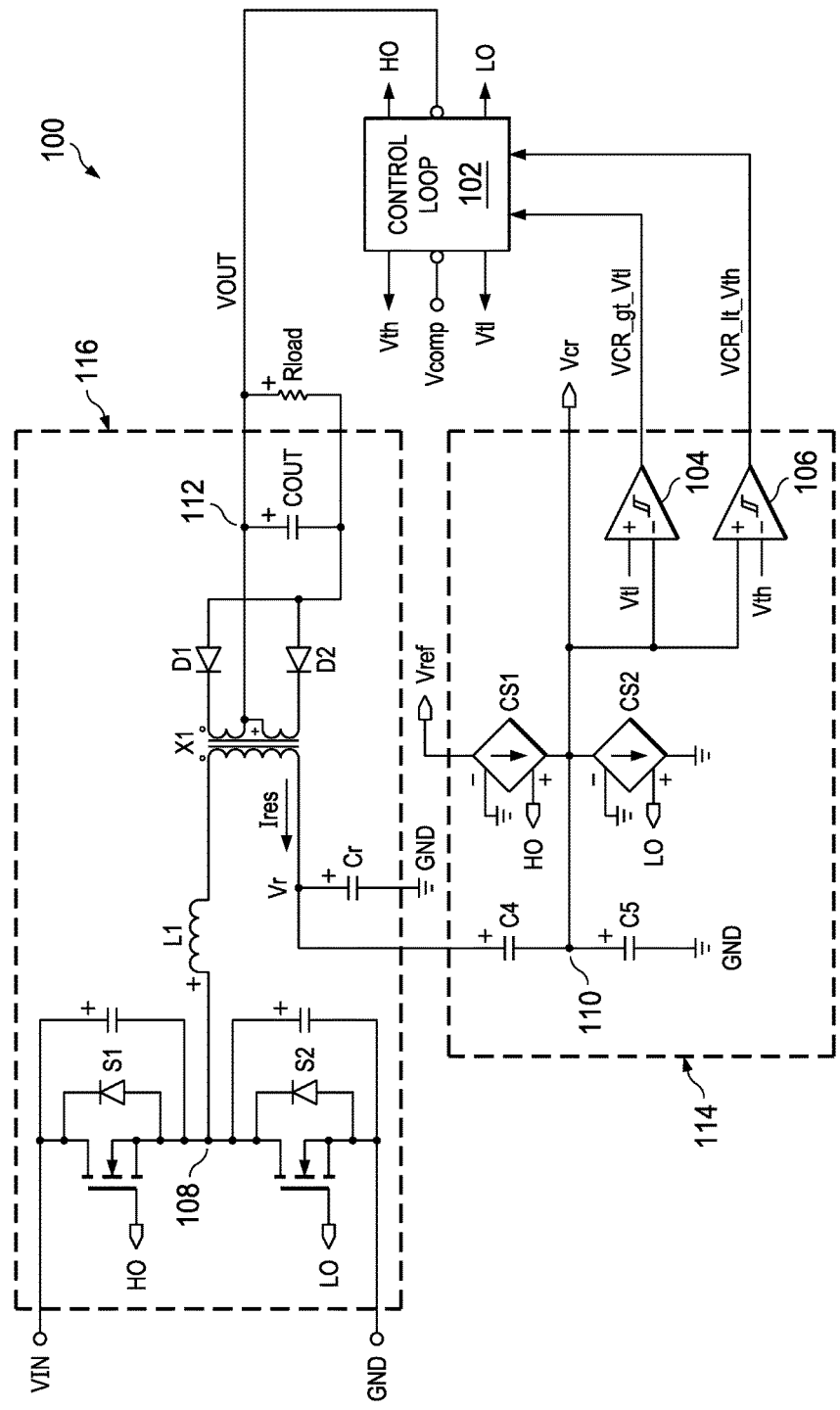
FIG. 1A is a block diagram of a switching converter having a control loop and a hybrid hysteretic control (HHC) circuit in accordance with a conventional approach.
Figure 1B:
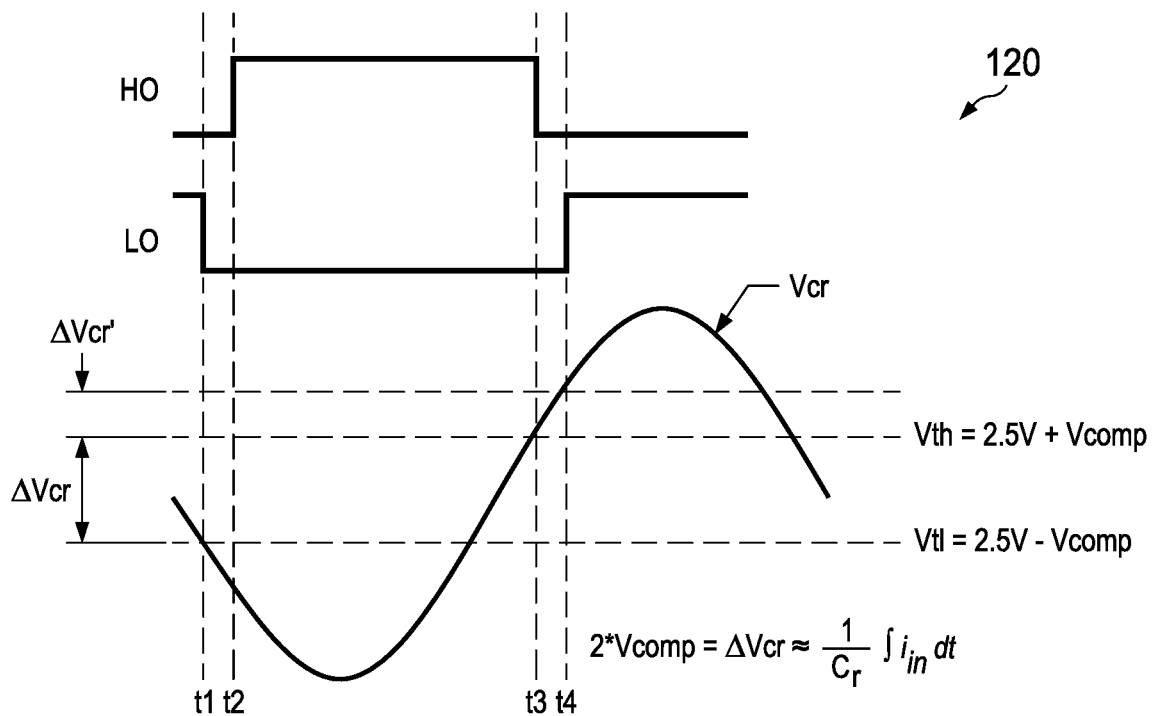
FIG. 1B is a timing diagram of control signals for the switching converter of FIG. 1A in accordance with a conventional approach.
Figure 3:
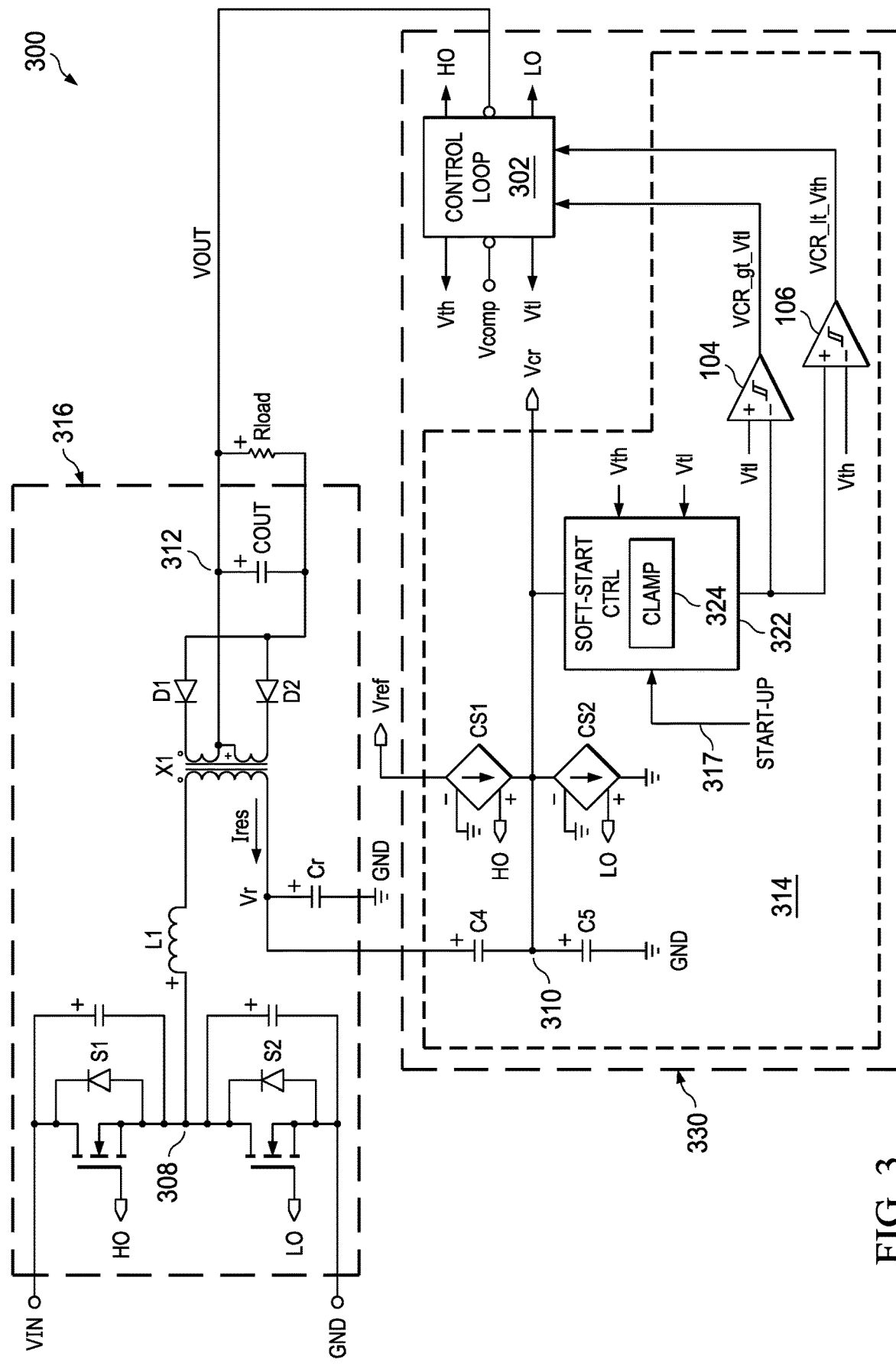
FIG. 3 is a block diagram of a switching converter having a control loop and an HHC circuit in accordance with an example embodiment.

FIG. 3 is a block diagram of a switching converter 300 having a control loop 302 and an HHC circuit 314 in accordance with an example embodiment. The HHC circuit 314 is distinguished from the HHC circuit 114 of FIG. 1 because the HHC circuit 314 includes a soft-start controller 322 with a clamp circuit 324 configured to clamp the voltage at a Vcr node 310 during start-up. As shown the HHC circuit 314 is part of a switching converter controller 330 coupled to a power stage 316 of the switching converter 300. In some example embodiments, the power stage 316 has the same topology as the power stage 116 in FIG. 1. In other example embodiments, the topology of the power stage 316 may vary. Example switching converter topologies that are compatible with soft-start clamping as described herein include: a full bridge LLC topology, a CLLC (capacitor-inductor-inductor-capacitor) topology, or a CLLLC (capacitor-inductor-inductor-inductor-capacitor) topology.

As shown in the example of FIG. 3, the power stage 316 includes a high-side switch (S1) and a low-side switch (S2) coupled in series between an input voltage (VIN) and ground (GND). S1 is, for example, an n-type metal-oxide semiconductor field-effect transistor (MOSFET) controlled by a high-side control signal (HO), while S2 is a n-type MOSFET controlled by a low-side control signal (LO). In some example embodiments, Gallium nitride (GaN) is used for certain layers of S1 and S2, instead of silicon. For each of S1 and S2, parasitic capacitance is represented by respective capacitors across the respective current terminals of S1 and S2. Between S1 and S2 is a switch node 308 coupled to an LLC resonant tank circuit of the power stage 316, where the LLC resonant tank circuit includes an inductor (L1), a primary coil of transformer X1, and Cr. In some embodiments, L1 is a leakage inductance inside X1. As shown, the switch node 308 is coupled to a first side of L1, while the second side of L1 is coupled to a first side of the primary coil of X1. Also, the second side of the primary coil of X1 is coupled to a first side of Cr, and the second side of Cr is coupled to ground.

As shown, the first side of Cr and the output node 312 of the power stage 316 are coupled to the switching converter controller 330. In the example of FIG. 3, the switching converter controller 330 includes the HHC circuit 314 coupled to the control loop 302. In some example embodiments, the HHC circuit 314 has the same topology as the HHC circuit 114 in FIG. 1, except the HHC circuit 314 includes the soft-start controller 322 with clamp circuit 324. In other example embodiments, the topology of the HHC circuit 314 may vary. For example, different charge control or current control options are possible besides the first current source (CS1) and the second current source (CS2).

In the example of FIG. 3, the HHC circuit 314 includes capacitors C4 and C5 in series between the first side of Cr and ground. Between C4 and C5 is the Vcr node 310, which sums a sense voltage for Cr (e.g., a reduced voltage proportional to the voltage across Cr) with a frequency compensation ramp. The HHC circuit 314 also includes CS1 and CS2 coupled to the Vcr node 310. CS1 is coupled between a reference voltage (Vref) and the Vcr node 310, and is controlled by HO. When CS1 is on (HO high), charge is added to the Vcr node 310, which increases the voltage at the Vcr node 310. Meanwhile, CS2 is coupled between the Vcr node 310 and ground, and is controlled by LO. When CS2 is on (LO high), charge is removed from the Vcr node 310, which decreases the voltage at the Vcr node 310.

Figure 5:
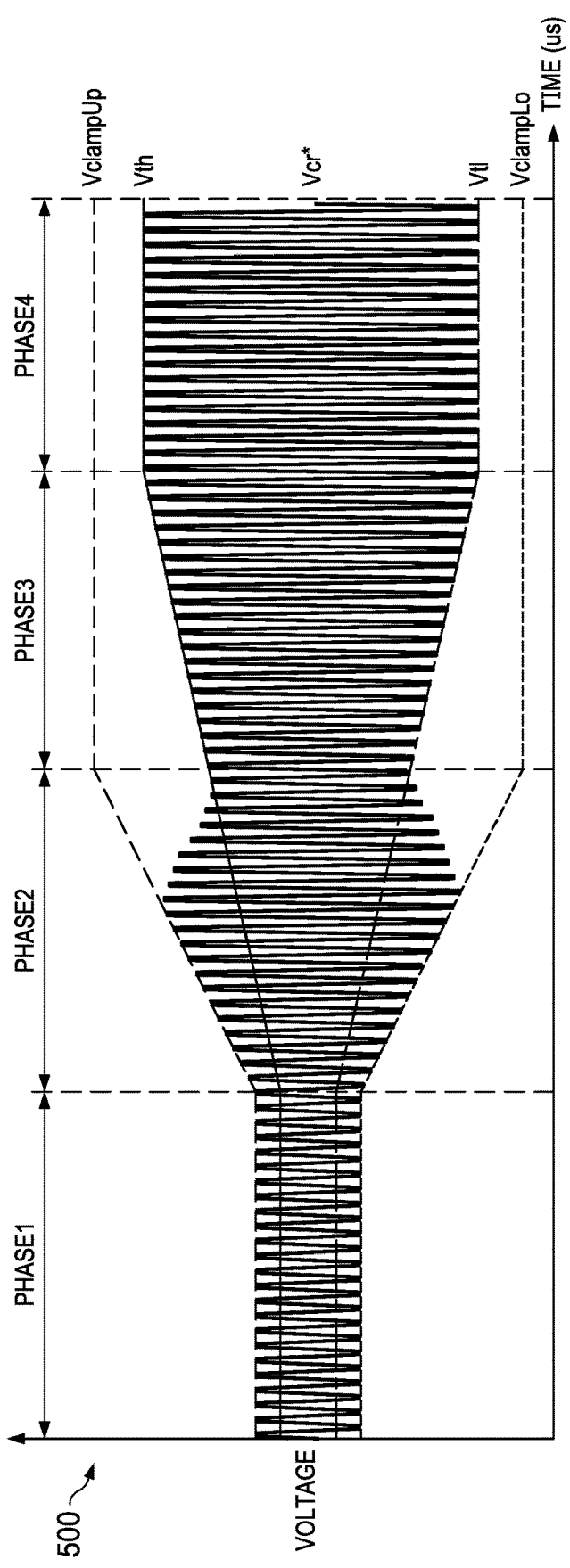
FIG. 5 is a graph of a resonant capacitor voltage (Vcr) as a function of time in accordance with an example embodiment.
Figure 7:
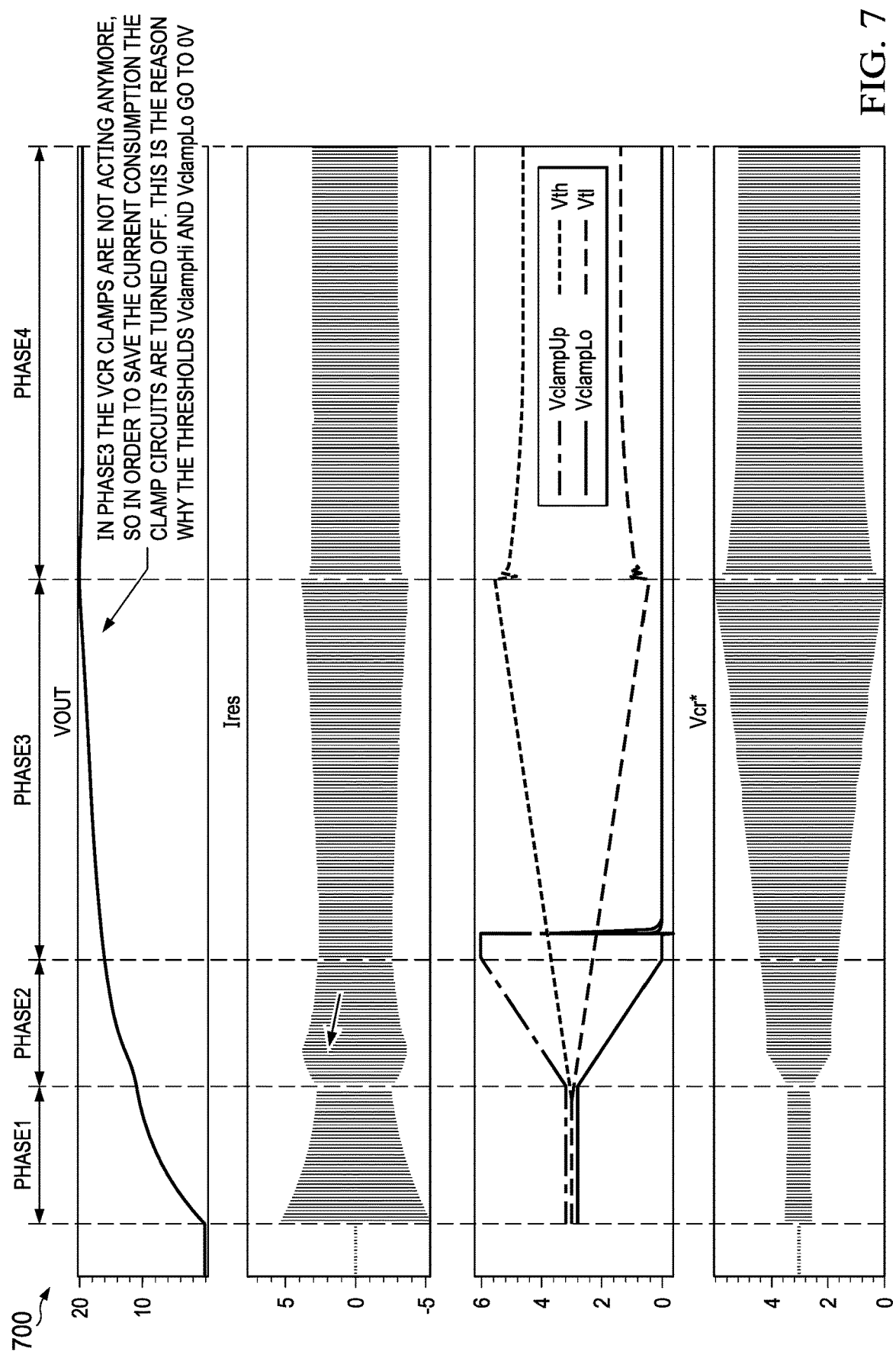
FIG. 7 is a graph of switching converter parameters in accordance with an example embodiment.

With the HHC circuit 314, the voltage at the Vcr node 310 is clamped by the clamp circuit 324 of the soft-start controller 322 during at least part of the start-up (this part of start-up is sometimes referred to herein as the clamped interval) of the power stage 316. After the clamped interval and during normal operations (after start-up is complete), the clamp circuit 324 may be turned off to reduce the overall current consumption of the IC. In other example embodiments, the clamp circuit 324 may remain active after the clamped interval and during normal operations to simplify control complexity. In such case, the HHC circuit 314 does not use clamped values to control the voltage at the Vcr node 310 after the clamped interval. In some example embodiments, the soft-start controller 322 uses a start-up signal 317, an upper threshold (Vth), and a lower threshold (Vtl) to perform soft-start operations. The start-up signal 317 indicates a start-up event and is used to turn on the clamp circuit 324. After the clamped interval is complete, the start-up signal 317 may be de-asserted, which causes the soft-start controller 322 to turn off the clamp circuit 324. The Vth and Vtl values input to the soft-start controller 322 may be used to control upper and lower voltage ranges of the clamp circuit 324 after the clamped interval of start-up (e.g., in phase 3 as shown in FIGS. 5 and 7).

The voltage at the Vcr node 310 (whether clamped or not) is compared with: Vtl by a first comparator 104; and Vth by a second comparator 106. The output of the first comparator 104 is a control signal (VCR_lt_Vtl) that indicates when the voltage at the Vcr node 310 is less than Vtl. The output of the second comparator 106 is a control signal (VCR_gt_Vth) that indicates when the voltage at the Vcr node 310 is greater than Vth.

In the example of FIG. 3, VCR_gt_Vth and/or VCR_lt_Vtl are provided to the control loop 302 as an HHC input. The control loop 302 is configured to control HO, LO, Vth, and Vtl based at least in part on VCR_gt_Vth, VCR_lt_Vtl, a compensation voltage (Vcomp), and an output voltage (VOUT) at the output node 312 of the power stage 316. More specifically, when VCR_gt_Vth is asserted, HO goes low, which turns off S1. Also, when VCR_lt_Vtl is asserted, LO goes low, which turns off S2. In addition, the control loop 102 uses: VOUT to determine Vcomp; and uses Vcomp to adjust Vth and Vtl. In one example embodiment, Vcomp is the output of an error amplifier with VOUT and a reference voltage as inputs of the error amplifier.

In the example of FIG. 3, VOUT at the output node 312 is obtained from a center tap of the secondary coil of X1. As shown, the output node 312 is coupled to an output capacitor (COUT). More specifically, a first side of COUT is coupled to the output node 312, and a second side of COUT is coupled to ground. Meanwhile, a resistor (Rload) represents a load, where a first side of Rload is coupled to the output node 312, and a second side of Rload is coupled to ground. In some example embodiments, the second sides of COUT and Rload are also coupled to the anodes of diodes D1 and D2. As shown, the cathode of D1 is coupled to a first side of the secondary coil of X1, and the cathode of D2 is coupled to a second side of the secondary coil of X1. In operation, the control loop 102 is configured to control S1 and S2 to maintain VOUT at a target voltage to supply power to Rload. In different example embodiments, Rload may vary over time. Also, in different example embodiments, power stage parameters (e.g., VOUT, the output current, the efficiency, and/or other parameters) may vary. In some example embodiments, Rload is a battery charger, a light-emitting diode (LED) string (e.g., part of a display), a server, personal computer, a notebook computer, or other variable load device.

Figure 4:
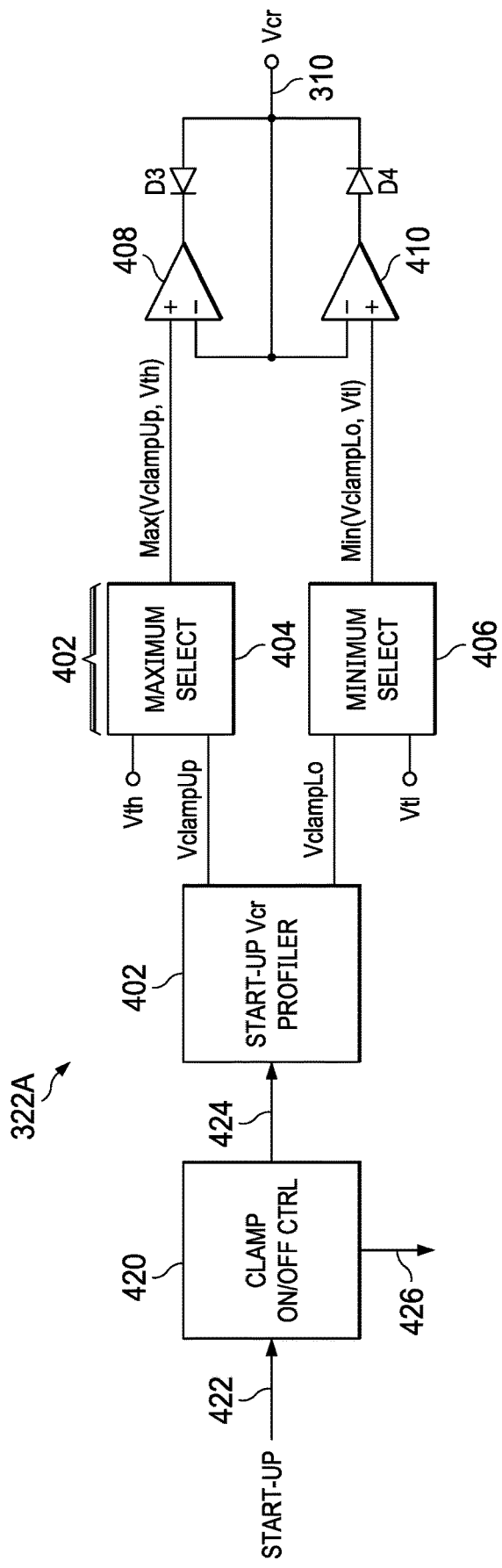
FIG. 4 is a block diagram of a soft-start controller for a switching converter controller in accordance with an example embodiment.

FIG. 4 is a block diagram of a soft-start controller 322A (an example of the soft-start controller 322 in FIG. 3) for a switching converter controller (e.g., the switching converter controller 330 in FIG. 3) in accordance with an example embodiment. In the example of FIG. 4, the soft-start controller 322A includes a clamp on/off controller 420 configured to provide a first clamp on/off signal 424 and a second clamp on/off signal 426 responsive to a start-up trigger or signal 422. The second clamp on/off signal 426 may turn on a clamp circuit during a clamped interval of start-up (e.g., Phase1 and Phase2 herein), and may turn off the clamp circuit after the clamped interval.

The first clamp on/off signal 424 is provided to a start-up Vcr profiler circuit 402. Responsive to the first clamp on/off signal 424 indicating start-up (or the clamped interval of start-up), the start-up Vcr profiler circuit 402 is configured to select upper and lower voltage thresholds (VclampUp and VclampLo) used by the clamp circuit (e.g., the clamp circuit 324 in FIG. 3) during the clamped interval of start-up. In some example embodiments, the start-up Vcr profiler circuit 402 is configured to apply a first threshold profile to the clamp circuit during a first phase (e.g., phase 1 in FIGS. 5 and 7) of the start-up. The first threshold profile may be, for example, a flat threshold profile that uses fixed values for the upper and lower thresholds (VclampUp and VclampLo) of the clamp circuit. In other example embodiments, the first threshold profile may be a ramped threshold profile that uses ramped values for the upper and lower thresholds (VclampUp and VclampLo) of the clamp circuit. In such embodiments, use of a flat threshold profile may be omitted. For example, both Phase1 and Phase2 may use ramped threshold values, where Phase1 uses smaller ramped values that continue ramping up in Phase2. As desired, the ramped values for Phase1 and Phase2 may have the same slope or different slopes. In one option, Phase1 and Phase2 are combined as a single phase with a longer ramped threshold profile.

In some example embodiments, the start-up Vcr profiler circuit 402 is configured to apply a second threshold profile to the clamp circuit during a second phase (e.g., phase 2 in FIGS. 5 and 7) of the start-up. The second threshold profile decreases an amount of clamping performed by the clamp circuit relative to the first threshold profile. In some example embodiments, the second threshold profile is a ramped threshold profile that uses ramped values for the upper and lower thresholds (VclampUp and VclampLo) of the clamp circuit. In some example embodiments, the soft-start controller 322A (e.g., using the clamp on/off controller 420) is configured to: turn on the clamp circuit during the clamped interval of the start-up; and turn off the clamp circuit after the clamped interval of the start-up. The clamp circuit may stay off during normal operations of a power stage to reduce power consumption.

In the example of FIG. 4, the soft-start controller 322A includes maximum selection logic 404 configured to select a maximum of two upper thresholds (VclampUp, Vth) for the clamp circuit. The maximum of VclampUp and Vth is selected by the maximum selection logic 404 and is provided to the non-inverting (+) input of an operational amplifier 408. As shown, the inverting (−) input of the operational amplifier 408 is coupled to the Vcr node 310. The soft-start controller 322A also includes minimum selection logic 406 configured to select a minimum of two lower thresholds (VclampLo, Vtl) for the clamp circuit. The minimum of VclampLo and Vtl selected by the minimum selection logic 406 is provided to the non-inverting (+) input of an operational amplifier 410. As shown, the inverting (−) input of the operational amplifier 410 is coupled to the Vcr node 310.

The soft-start controller 322A also includes diodes D3 and D4 coupled to respective outputs of the operational amplifier 408 and the operational amplifier 410. More specifically, the anode of D3 is coupled to the Vcr node 310, and the cathode of D3 is coupled to the output of the operational amplifier 408. Also, the anode of D4 is coupled to the output of the operational amplifier 410, and the cathode of D4 is coupled to the Vcr node 310. With the soft-start controller 322A, the voltage at the Vcr node 310 is clamped during a first phase and a second phase of start-up to limit the resonant current. In the third phase of start-up, the clamp circuit is turned off, which allows the voltage at the Vcr node 310 to ramp up slowly. In a fourth phase, VOUT has reached its target value and normal operations of a power stage and switching converter controller are performed using Vth and Vtl to define upper and lower thresholds for Vcr.

FIG. 5 is a graph 500 of Vcr (the voltage at the Vcr node 310) as a function of time in accordance with an example embodiment. As shown, the graph 500 includes four phases labeled Phase1, Phase2, Phase3, and Phase4. Specifically, Phase1 to Phase3 are part of the start-up of a switching converter (e.g., the switching converter 300), while Phase4 is part of the normal operations of the switching converter. More specifically, Phase1 and Phase2 are a clamped interval of the start-up, while Phase3 is an unclamped interval of the start-up. In Phase 1, Vcr is clamped using a first threshold profile for VclampUp and VclampLo. As shown, VclampUp and VclampLo are flat during Phase1. In Phase 2, Vcr is clamped using a second threshold profile for VclampUp and VclampLo. As shown, VclampUp and VclampLo are ramped during Phase2, where the second threshold profile decreases an amount of clamping performed by the clamp circuit relative to the first threshold profile (i.e., the voltage range of Vcr increases in Phase2 relative to Phase1). In Phase2, the voltage levels for Vcr follow VclampUp and VclampLo initially, then Vcr ramps down until reaching Vth and Vtl. During Phase2, Vcr ramps down because the dynamics of the charge transfer change such that the overshoot reduces. The main reason for the overshoot reduction is that VOUT becomes high enough such that the primary side switches are no longer applying as much voltage across the resonant inductor. As the change in the resonant current becomes smaller so does the change in the voltage across the Cr.

In Phase3, the clamp circuit may be turned off and Vcr stays within Vth and Vtl, which follow a ramped threshold profile until Phase4. In Phase4, the clamp circuit stays off and Vcr stays within Vth and Vtl, which follow a flat threshold profile during normal switching converter operations related to Phase 4.

Figure 6:
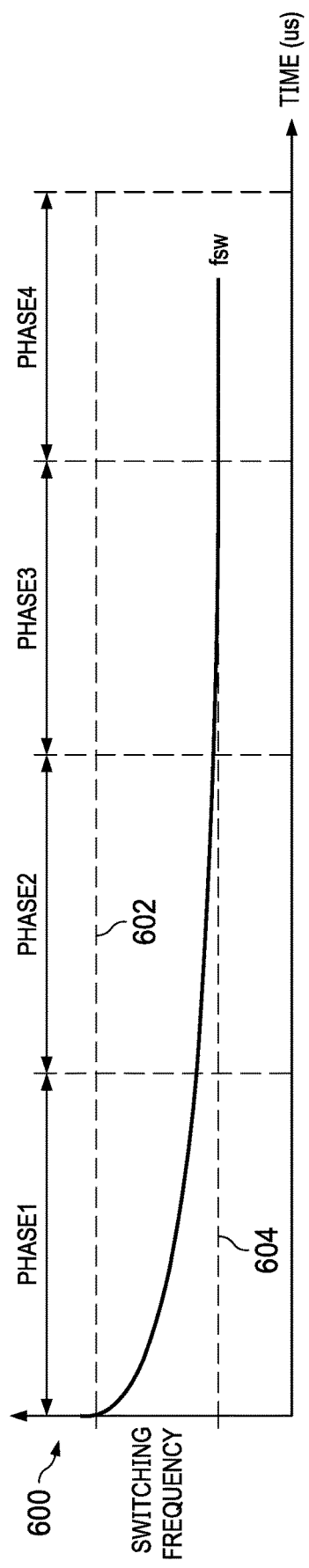
FIG. 6 is a graph of switching frequency of a switching converter as a function of time in accordance with an example embodiment.

FIG. 6 is a graph 600 of switching frequency (fsw) of a switching converter (e.g., the switching converter 300 in FIG. 3, or the switching converter 300A in FIG. 7) as a function of time in accordance with an example embodiment. As shown, the graph 600 includes Phase1 to Phase4 described in FIG. 3. In the example of FIG. 6, fsw starts at an initial value 602 at the beginning of Phase1 and ends at final value 604 near the beginning of Phase 3. As shown, fsw stays flat once reaching the final value 604. In some example embodiments, the initial value 602 may range from about 1 MHz to 2 MHz, and the final value 604 may be about 500 kHz. In other example embodiments, the initial value 602 may range from about 2 MHz to 3 MHz, and the final value 604 may be about 1 MHz. In still other example embodiments, the initial value 602 and the final value 604 may vary, where the final value 604 is less than the initial value 602.

FIG. 7 is a graph 700 of switching converter parameters in accordance with an example embodiment. In the graph 700, the switching converter parameters include VOUT, a resonant current (Ires) corresponding to the current in L1, VclampUp, VclampLo, Vth, Vtl, and Vcr. In the example of FIG. 7, VOUT increases from 0V at the beginning of Phase1 to 20V at the beginning of Phase4. Ires ranges between about −5V to 5V during Phase1 to Phase 4.

In Phase 1, Vcr is clamped using a first threshold profile for VclampUp and VclampLo. As shown, VclampUp and VclampLo are flat during Phase1. With Phase1, the system is pushed to operate at a high switching frequency (e.g., 2-3 times higher than the LLC resonance tank frequency), and the resonant current is well controlled.

In Phase 2, Vcr is clamped using a second threshold profile for VclampUp and VclampLo. As shown, VclampUp and VclampLo are ramped during Phase2, where the second threshold profile decreases an amount of clamping performed by the clamp circuit relative to the first threshold profile (i.e., the voltage range of Vcr increases in Phase2 relative to Phase1). In Phase2, Vcr follows VclampUp and VclampLo initially, then Vcr flattens and ramps slightly until Phase3. With Phase2, the amplitude of Vcr increases, following the clamp thresholds, and the resonant current is still well controlled. Also, HHC control with clamping is performed in Phase2, resulting in Vth and Vtl slowly ramping (the Vth and Vtl slope is much slower than the Vcr ramping profile in Phase 2) to guarantee the soft-start. The transition from Vcr ramping clamp to soft-start control occurs in Phase2. In some example embodiments, HHC control is always enabled (e.g., with clamping in Phase1 and Phase2, or without clamping in Phase 3 and Phase4).

In Phase3, the clamp circuit is turned off and, in order to save power, VclampUp and VclampLo may go to 0V. During Phase3, Vcr stays within Vth and Vtl, which follow a ramped threshold profile until Phase4. With Phase3, the Vth and Vtl thresholds slowly ramp to provide the soft-start and avoid any overshoot of VOUT.

In Phase4, the clamp circuit is off and Vcr stays within Vth and Vtl during the normal switching converter operations related to Phase 4. Phase4 begins at the transition from soft-start to HHC mode. When the system reaches Phase4, the HHC mode regulates VOUT according to the load conditions. For Phase4, Vth and Vtl are set as a function of the Vcomp. With a soft-start controller (e.g., the soft-start controller 322 in FIG. 3, or the start controller 322A in FIG. 4), Ires is maintained within a target envelope of values by clamping Vcr to avoid overstressing power stage components.

Figure 8:
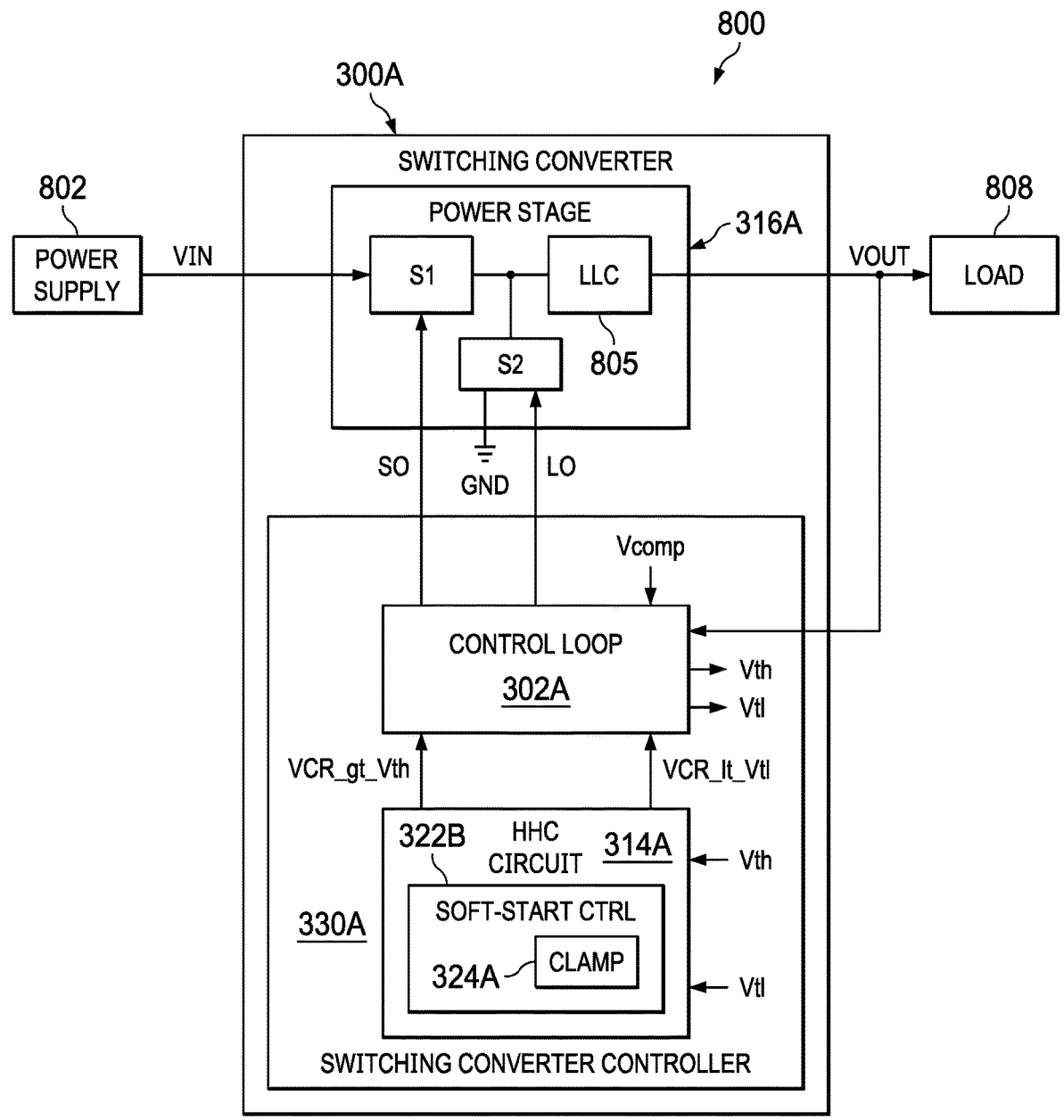
FIG. 8 is block diagram of a system in accordance with an example embodiment.

FIG. 8 is block diagram of a system 800 in accordance with an example embodiment. As shown, the system 800 includes a switching converter 300A (an example of the switching converter 300 in FIG. 3) coupled to a power supply 802 and a load 808. In one example embodiment, VIN is about 400V, VOUT is about 12V, and the load 808 is a battery charger, an LED string (e.g., inside of a monitor), a server, a personal computer, a notebook computer, or another 300 W to 700 W load. In other example embodiments, VIN VOUT, and/or the power rating may vary. The power supply 802 is configured to provide VIN to the switching converter 300A. In operation, the switching converter 300A is configured to provide VOUT to the load 808 based on VIN, a power stage 316A (an example of the power stage 316 in FIG. 3), and a switching converter controller 330A (an example of the switching converter controller 330 in FIG. 3).

In the example of FIG. 8, the power stage 316A includes S1, S2, and an LLC resonant tank circuit 805. The switching converter controller 330A includes a control loop 302A (an example of the control loop 302 in FIG. 3) coupled to an HHC circuit 314A (an example of the HHC circuit 314 in FIG. 3). The HHC circuit 314A includes a soft-start controller 322B (an example of the soft-start controller 322 in FIG. 3, or the soft-start controller 322A in FIG. 4) with a clamp circuit 324A (an example of the clamp circuit 324 in FIG. 3). The control loop 302A includes an HHC input (VCR_gt_Vth and/or VCR_lt_Vtl) based on adding charge to or removing charge from Vcr. At start-up, the soft-start controller 322B turns on the clamp circuit 324A to clamp Vcr (see FIGS. 5 and 7) to keep Ires within a target range, and thus avoid overstressing power stage components as described herein.

Figure 9:
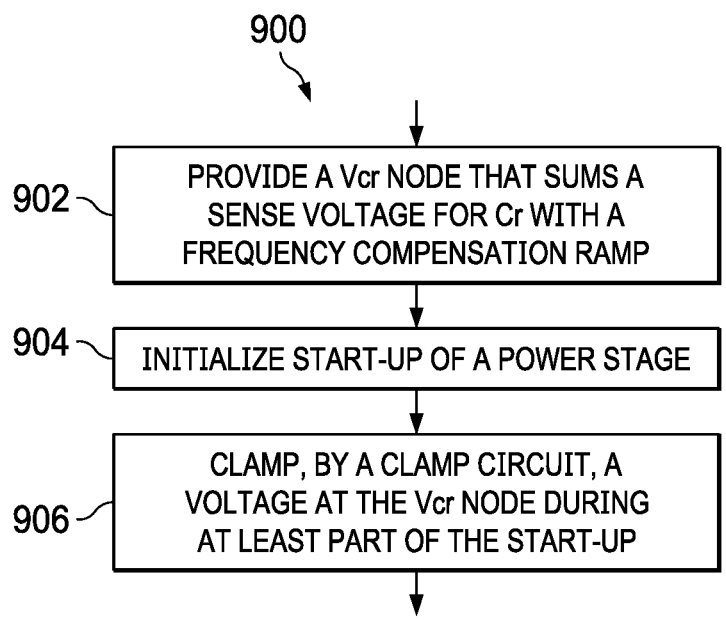
FIG. 9 is a flowchart of a method in accordance with an example embodiment.
Figure 2:
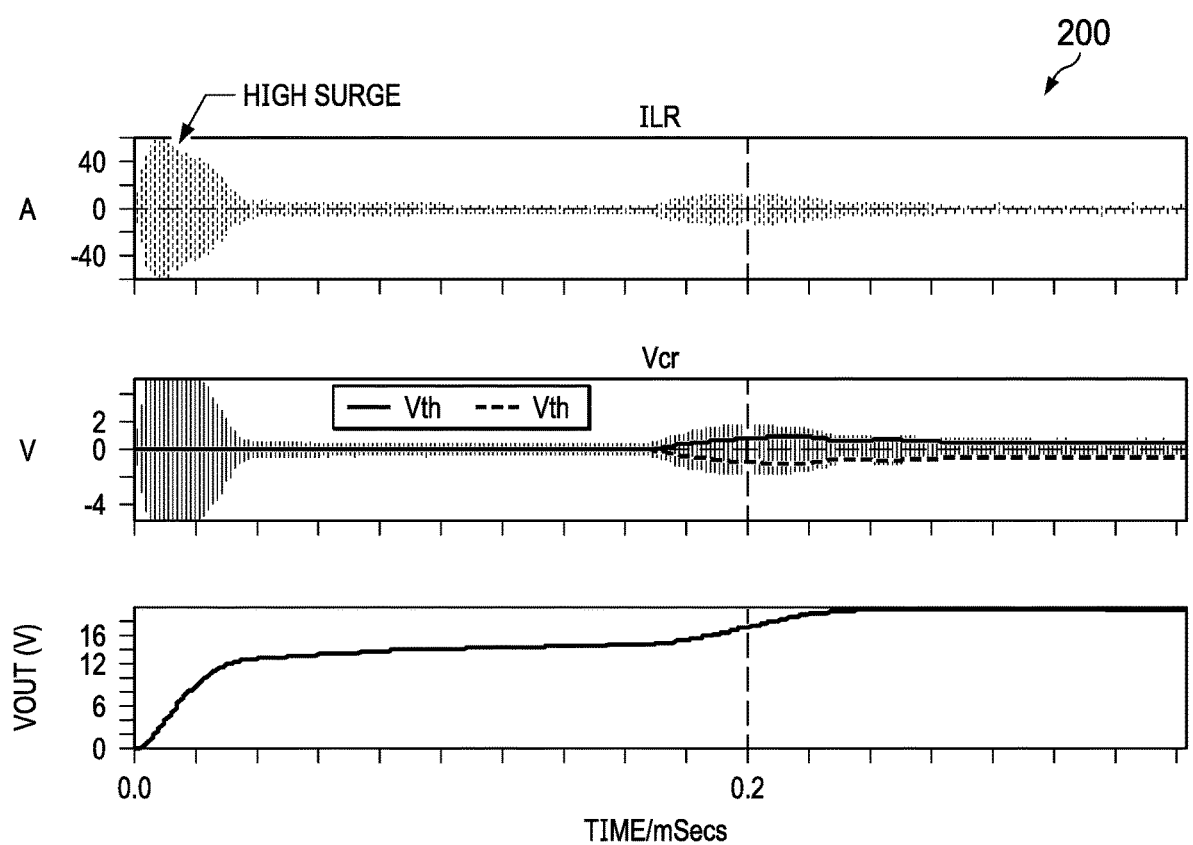
FIG. 2 is a graph of voltages and currents related to the switching converter of FIG. 1A in accordance with a conventional approach.

FIG. 9 is a flowchart of a method 900 in accordance with an example embodiment. The method 900 is performed, for example, by a switching converter controller (e.g., the switching converter controller 330 in FIG. 3, or the switching converter controller 330A in FIG. 8) for a power stage (e.g., the power stage 316 in FIG. 3, or the power stage 316A in FIG. 8) having an LLC resonant tank circuit (e.g., the LLC resonant tank circuit 805 in FIG. 8) with Cr. As shown, the method 900 includes providing a Vcr node (e.g., the Vcr node 310 in FIG. 3) that sums a sense voltage for Cr with a frequency compensation ramp at block 902. In some example embodiments, the sense voltage for Cr is a scaled voltage relative to the voltage at Cr (e.g., in FIG. 3, C4 and C5 provide a scaling control). At block 904, start-up of the power stage is initialized. In some example embodiments, block 904 is omitted (e.g., if the clamp circuit is always on, and thus turning a clamp circuit on responsive to a start-up trigger in not needed). At block 906, a voltage at the Vcr node is clamped, by a clamp circuit, during at least part of the start-up. In some example embodiments, a clamp circuit (e.g., the clamp circuit 324 in FIG. 3, or the clamp circuit 324A in FIG. 8) may be off, except during Phase1 and Phase2 of start-up as described herein.

In some example embodiments, the method 900 includes using a threshold profile to apply fixed upper and lower voltage thresholds to the clamp circuit during a clamped interval of the start-up. In some example embodiments, the method 900 includes using a threshold profile to apply ramped upper and lower voltage thresholds to the clamp circuit during a clamped interval of the start-up. In some example embodiments, flat or ramped values are used during Phase1 of start-up (e.g., Phase 1 is part of the clamped interval), and ramped values are used during Phase2 of start-up (e.g., Phase 2 is part of the clamped interval). The threshold profile of Phase 2 may decrease an amount of clamping performed by the clamp circuit relative to the threshold profile of Phase1.

In some example embodiments, the method 900 includes: turning on the clamp circuit during a clamped interval (e.g., Phase 1 and Phase2 herein) of the start-up; and turning off the clamp circuit after the clamped interval of the start-up. In some example embodiments, the method 900 includes: selecting a maximum of two upper thresholds (e.g., VclampUp or Vth) for the clamp circuit; and selecting a minimum of two lower thresholds (e.g., VclampLo or Vtl) for the clamp circuit.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

As used herein, the terms "terminal", "node", "interconnection", "pin", "contact", and "connection" are used interchangeably. Unless specifically stated to the contrary, these terms are generally used to mean an interconnection between or a terminus of a device element, a circuit element, an integrated circuit, a device or other electronics or semiconductor component.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value.

Modifications are possible in the described embodiments, and other embodiments are possible, within the scope of the claims.

What is claimed is:

1. A switching converter controller, comprising: a control loop coupled to a power stage output terminal; and a hybrid hysteretic control (HHC) circuit coupled to the control loop, the HHC circuit having: a resonant capacitor voltage terminal coupled to a resonant capacitor, wherein a voltage at the resonant capacitor voltage terminal is summed with a frequency compensation ramp; and a soft-start controller coupled to the resonant capacitor voltage terminal, wherein the soft-start controller includes a clamp circuit.

2. The switching converter controller of claim 1, wherein the soft-start controller includes a start-up circuit configured to select upper and lower voltage thresholds of the clamp circuit.

3. The switching converter controller of claim 2, wherein the start-up circuit is configured to apply a first threshold profile for the clamp circuit during a first phase of a start-up.

4. The switching converter controller of claim 3, wherein the start-up circuit is configured to apply a second threshold profile for the clamp circuit during a second phase of the start-up, the second threshold profile decreasing an amount of clamping performed by the clamp circuit compared to the first threshold profile.

5. The switching converter controller of claim 4, wherein the first threshold profile is a flat threshold profile that uses fixed values for the upper and lower thresholds of the clamp circuit.

6. The switching converter controller of claim 4, wherein the first threshold profile is a ramped threshold profile that uses ramped values for the upper and lower thresholds of the clamp circuit.

7. The switching converter controller of claim 4, wherein the second threshold profile is a ramped threshold profile that uses ramped values for the upper and lower thresholds of the clamp circuit.

8. The switching converter controller of claim 3, wherein the soft-start controller is configured to:
turn on the clamp circuit during a clamped interval of the start-up; and
turn off the clamp circuit after the clamped interval.

9. The switching converter controller of claim 1, wherein the soft-start controller includes:
maximum selection logic configured to select a maximum of two upper thresholds for the clamp circuit; and
minimum selection logic configured to select a minimum of two lower thresholds for the clamp circuit.

10. A system, comprising: a power stage having: an inductor-inductor-capacitor (LLC) resonant tank circuit with a resonant capacitor; and an output terminal coupled to the LLC resonant tank circuit; a switching converter controller coupled to the power stage, the switching converter controller including: a control loop coupled to the output terminal; and a hybrid hysteretic control (HHC) circuit coupled to the control loop, the HHC circuit having: a resonant capacitor voltage terminal coupled to the resonant capacitor, wherein a voltage at the resonant capacitor voltage terminal is summed with a frequency compensation ramp; and a soft-start controller coupled to the resonant capacitor voltage terminal, the soft-start controller including a clamp circuit configured to clamp a voltage at the resonant capacitor voltage terminal during at least part of a start-up.

11. The system of claim 10, wherein the soft-start controller includes a start-up profiler circuit configured to select upper and lower voltage thresholds of the clamp circuit.

12. The system of claim 11, wherein the start-up profiler circuit is configured to apply a flat threshold profile for the clamp circuit during a first phase of the start-up, the flat threshold profile using fixed values for the upper and lower thresholds of the clamp circuit.

13. The system of claim 12, wherein the start-up profiler circuit is configured to apply a second threshold profile for the clamp circuit during a second phase of the start-up, the second threshold profile decreasing an amount of clamping performed by the clamp circuit compared to the flat threshold profile.

14. The system of claim 13, wherein the second threshold profile is a ramped threshold profile that uses ramped values for the upper and lower thresholds for the clamp circuit.

15. The system of claim 11, wherein the start-up profiler circuit is configured to apply a ramped threshold profile for the clamp circuit during a first phase of the start-up, the ramped threshold profile using ramped values for the upper and lower thresholds of the clamp circuit.

16. The system of claim 10, wherein the soft-start controller is configured to:
turn on the clamp circuit during a clamped interval of the start-up; and
turn off the clamp circuit after the clamped interval of the start-up.

17. The system of claim 10, wherein the soft-start controller includes:
maximum selection logic configured to select a maximum of two upper thresholds for the clamp circuit; and
minimum selection logic configured to select a minimum of two lower thresholds for the clamp circuit.

18. A method, performed by a switching converter controller for a power stage having a resonant tank circuit with a resonant capacitor, the method comprising:
providing a resonant capacitor voltage terminal for summing a sense voltage for the resonant capacitor with a frequency compensation ramp; and
clamping, by a clamp circuit, a voltage at the resonant capacitor voltage terminal during at least part of a power stage start-up.

19. The method of claim 18, further comprising using a threshold profile to apply fixed upper and lower voltage thresholds to the clamp circuit during a clamped interval of the power stage start-up.

20. The method of claim 18, further comprising using a threshold profile to apply ramped upper and lower voltage thresholds to the clamp circuit during a clamped interval of the power stage start-up.

21. The method of claim 18, further comprising:
turning on the clamp circuit during a clamped interval of the power stage start-up; and
turning off the clamp circuit after the clamped interval.

22. The method of claim 18, further comprising:
selecting a maximum of two upper thresholds for the clamp circuit; and
selecting a minimum of two lower thresholds for the clamp circuit.

* * * * *